Patented July 23, 1929.

UNITED STATES PATENT OFFICE.

RODNEY B. HARVEY, OF ST. PAUL, MINNESOTA, ASSIGNOR TO UNIVERSITY OF MINNESOTA, OF MINNEAPOLIS, MINNESOTA.

METHOD OF BLANCHING CELERY AND OTHER GREEN VEGETABLES.

No Drawing.   Application filed November 13, 1924.   Serial No. 749,792.

The process of blanching celery heretofore carried out has been substantially as follows: The celery when grown to a proper height in the field in rows is hilled up with soil or boards; or, paper is placed on each side of the rows, thereby shading the stalks from the sunlight and causing the disappearance of the bitter, acrid, green substances in the stalks and younger leaves. In this way the self-blanching varieties of celery may be blanched within three to six weeks and the green varieties, which are not self-blanching, in from six to ten weeks, depending upon the degree of blanching that is desired. The varieties which are not self-blanching are seldom usable as table vegetables on account of the bitter, acrid, green substances which they contain. Yet these varieties in many cases are more healthy and more vigorous plants, and when properly blanched by this new method yield celery of better quality than the self-blanching varieties.

My investigations on the blanching of celery have led to the conclusion that on blanching celery the acrid, bitter, green substance in stalks and leaves can be removed or decomposed by exposing the celery to ethylene or acetylene gas in admixture with air. The ethylene and acetylene may be obtained commercially in tanks of the compressed gas, or the acetylene may be generated from calcium carbide. If either compressed ethylene or acetylene is used for blanching celery, it is liberated into the storage room, cellar, or railway car in sufficient amounts to bring the concentration of the gas up to between one part in one hundred thousand and one part in one hundred parts of air. A temperature of about 65° to 75° Fahrenheit is most favorable, but blanching may be produced at any ordinary temperatures above freezing. Celery may also be blanched in the field by covering the rows with a tight cover of canvas, or oil cloth, or tin, or iron, or wooden tanks or boxes, and then liberating the gas into these enclosed spaces until a proper concentration is reached, as stated above. On account of its convenience in measuring and handling, the generation of acetylene from calcium carbide is useful. The calcium carbide may be placed in a container and water poured upon it to cause the evolution of the acetylene, or the calcium carbide may be exposed in shallow vessels in storage rooms causing the evolution of gas by the absorption of water from the air, or it may be scattered on the ground underneath canvas or other tight enclosures in the field, thereby causing the production of acetylene gas within the space in which the celery is to be blanched.

By the methods described above, the self-blanching varieties of celery may be blanched sufficiently for market within from four to seven days, and all of the green color (chlorophyll) will be removed within from six to ten days. It is preferable to leave a small amount of green color in stalks and leaves. The green varieties of celery which are not self-blanching can be blanched in from eight to twelve days.

The celery blanched in this manner is devoid of the disagreeable acrid, bitter, green substances; it is sweeter to taste and less stringy than celery which has been blanched by the formerly used process of hilling with soil or with boards or paper.

Substitution of this new method of blanching celery will greatly reduce the time required to prepare celery for the market; it will reduce the labor of hilling with soil or with boards or paper; it will allow the celery to be grown in the field until a later date than usual and then to be taken into storage or into transit in tight cars and blanched by means of ethylene or acetylene gas.

The ethylene and acetylene used have no bleaching action such as is shown by sulfur dioxide and chlorine gas. In this process of blanching, neither the red nor yellow pigments are destroyed. The action of the ethylene and acetylene seems to hasten the process of blanching which normally takes a longer time to produce marketable celery.

The same method as described above for blanching celery may be used to blanch endive, asparagus, lettuce, chicory, and other leafy vegetables from which it is desired to remove acrid, bitter, green substances.

I claim as my invention:

1. A method of treating leafy green vegetables to remove acrid bitter green substances, which consists in exposing the vegetables to the action of an unsaturated hydrocarbon gas, admixed with air in proportions ranging from, one part of the gas to one hundred thousand parts of air, to, one part of gas to one hundred parts of air.

2. A method of treating leafy green vegetables to remove acrid bitter green substances, which consists in exposing the vegetables to the action of an unsaturated hydrocarbon gas, admixed with air substantially in the proportion of one part of the gas to one hundred parts of air.

3. A method of treating leafy green vegetables to remove acrid bitter green substances which consists in exposing the vegetables to the action of an unsaturated hydrocarbon gas, admixed with air substantially in the proportion of one part of the gas to five hundred parts of air.

4. A method of treating celery, to remove acrid bitter green substances, which consists in exposing the celery to the action of an unsaturated hydrocarbon gas admixed with air in proportions ranging from, one part of the gas to one hundred thousand parts of air, to, one part of gas to one hundred parts of air.

5. A method for treating celery, to give a sweeter taste, which consists in exposing the celery to the action of an unsaturated hydrocarbon gas admixed with air in proportions ranging from one part of gas to one hundred thousand parts of air, to, one part of gas to one hundred parts of air.

6. A method for treating celery, to give a sweeter taste, and to decrease stringiness, which consists in exposing the celery to the action of an unsaturated hydrocarbon gas admixed with air in proportions ranging from, one part of gas to one hundred thousand parts of air, to, one part of gas to one hundred parts of air.

7. A method of treating celery, to remove acrid bitter green substances without destruction of the red or yellow pigments, which consists in exposing the celery to the action of an unsaturated hydrocarbon gas admixed with air in proportions ranging from, one part of gas to one hundred thousand parts of air, to, one part of gas to one hundred parts of air.

8. A method of treating leafy green vegetables to remove acrid bitter green substances, which consists in exposing the vegetables to the action of ethylene, admixed with air in proportions ranging from, one part of the gas to one hundred thousand parts of air, to, one part of gas to one hundred parts of air.

9. A method for treating leafy green vegetables to remove acrid bitter green substances, which consists in exposing the vegetables to the action of ethylene, admixed with air substantially in the proportion of one part of the gas to one hundred parts of air.

10. A method of treating leafy green vegetables to remove acrid bitter green substances which consists in exposing the vegetables to the action of ethylene, admixed with air substantially in the proportion of one part of the gas to five hundred parts of air.

In witness whereof, I have hereunto set my hand this 8th day of November, 1924.

RODNEY B. HARVEY.